(12) United States Patent
Park

(10) Patent No.: US 9,614,381 B2
(45) Date of Patent: Apr. 4, 2017

(54) SYSTEM FOR PERFORMING RECHARGING AND DATA COMMUNICATION

(71) Applicant: Samsung Electronics Co., Ltd., Gyeonggi-do (KR)

(72) Inventor: Jung-Hoon Park, Incheon (KR)

(73) Assignee: Samsung Electronics Co., Ltd (KR)

( * ) Notice: Subject to any disclaimer, the term of this patent is extended or adjusted under 35 U.S.C. 154(b) by 412 days.

(21) Appl. No.: 14/166,222

(22) Filed: Jan. 28, 2014

(65) Prior Publication Data

US 2014/0225557 A1 Aug. 14, 2014

(30) Foreign Application Priority Data

Feb. 13, 2013 (KR) .......................... 10-2013-0015231

(51) Int. Cl.
*H02J 7/00* (2006.01)
*H04M 1/02* (2006.01)
*H01R 31/06* (2006.01)

(52) U.S. Cl.
CPC .......... *H02J 7/0004* (2013.01); *H01R 31/065* (2013.01); *H04M 1/0274* (2013.01)

(58) Field of Classification Search
CPC ........ H02J 7/025; H02J 7/0004; H02J 7/0047; H02J 5/005; H02J 7/0006; H02J 7/0052; H02J 7/0068; H02J 7/0091; H02J 50/20; H02J 50/80; H02J 7/0011; H02J 7/0021; H02J 7/0055; H02J 7/0072; H02J 7/00

USPC .................................................. 320/106–115
See application file for complete search history.

(56) References Cited

U.S. PATENT DOCUMENTS

| 8,957,633 B2* | 2/2015 | Yoon ............................ 320/108 |
| 2006/0244422 A1* | 11/2006 | DiGiovanna ......... G06F 1/3203 320/137 |
| 2009/0140692 A1* | 6/2009 | Hwang .................. G08C 17/04 320/108 |

FOREIGN PATENT DOCUMENTS

KR 20120042445 5/2012

* cited by examiner

*Primary Examiner* — Binh Tat
(74) *Attorney, Agent, or Firm* — The Farrell Law Firm, P.C.

(57) ABSTRACT

A system is provided for performing recharging and data communication. The system includes a terminal and a connection device that connects the terminal and an external device, and that selectively provides the terminal with a recharging function, a data communication function, and a recharging and data communication function, according to a type of the connected external device. The terminal determines the type of the connected external device based on a voltage received from the connection device, when the terminal is connected to the connection device, and selectively operates in a recharging mode, a data communication mode, and a recharging and data communication mode based on the type of the connected external device.

7 Claims, 9 Drawing Sheets

SYSTEM FOR PERFORMING RECHARGING AND DATA COMMUNICATION

PRIORITY

This application claims priority under 35 U.S.C. §119(a) to Korean Application Serial No. 10-2013-0015231, which was filed in the Korean Intellectual Property Office on Feb. 13, 2013, the entire content of which is hereby incorporated by reference.

BACKGROUND OF THE INVENTION

1. Field of the Invention

The present disclosure relates generally to a system for performing recharging and data communication, and more particularly, to a system for simultaneously performing a recharging function and a data communication function.

2. Description of the Related Art

A terminal performs, for example, an On The Go (OTG) function, a recharging function, or a USB data communication and recharging function according to a kind of device connected to the terminal.

More specifically, when an OTG cable is connected to the terminal, the terminal recognizes the connection of the OTG cable, supplies power to a device connected via the OTG cable, e.g., a mouse, a keyboard, a display unit, etc., and performs data communication with the device. However, while data communication is performed between the terminal the device via the OTG cable, when the power of a battery of the terminal gets too low, the OTG cable must be disconnected from the terminal in order to charge the battery of the terminal.

After the battery of the terminal is completely recharged, the OTG cable can then be re-connected, and data communication with the device connected via the OTG cable can be performed.

SUMMARY OF THE INVENTION

Accordingly, the present disclosure is designed to address at least the problems and/or disadvantages described above and to provide at least the advantages described below.

An aspect of the present disclosure is to provide a system that can simultaneously perform a data communication function and a recharging function.

Another aspect of the present disclosure is to provide a system capable of recharging and data communication that can provide a terminal with a recharging function, a data communication function, or a recharging and data communication function, with a connection device.

In accordance with an aspect of the present disclosure, a system capable of performing recharging and data communication is provided. The system includes a terminal; and a connection device that connects the terminal and an external device, and that selectively provides the terminal with a recharging function, a data communication function, and a recharging and data communication function, according to a type of the connected external device. The terminal determines the type of the connected external device based on a voltage received from the connection device, when the terminal is connected to the connection device, and selectively operates in a recharging mode, a data communication mode, and a recharging and data communication mode based on the type of the connected external device.

In accordance with another aspect of the present disclosure, a connection device is provided for a recharging and data communication function. The connection device includes a first connector that connects a terminal; a second connector that connects an external device; and a voltage supplier that provides the terminal connected to the first connector with different voltages for informing of a recharging function, a data communication function, and a recharging and data communication function, respectively, based on a type of the external device connected to the second connector.

In accordance with another aspect of the present disclosure, a connection device is provided for a recharging and data communication function. The connection device includes a power converter that supplies power; a first connector that connects a terminal or an external device for data communication; a second connector that connects the terminal, when the external device for data communication is connected to the first connector; and a switch that connects data communication lines, when a recharging function is performed, and releases a connection of the data communication lines, when a data communication function or a recharging and data communication function is performed In accordance with another aspect of the present disclosure, a terminal for performing recharging and data communication is provided. The terminal includes a display that displays an indication of a mode performed by a connection device, when the connection device is connected to the terminal; and a controller that determines a type of an external device connected to the connection device, based on voltage received from the connection device, when the terminal is connected with the connection device, and that performs a recharging mode, a data communication mode, or a recharging and data communication mode according to the type of the external device.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION OF EMBODIMENTS OF THE PRESENT INVENTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

A terminal according to an embodiment of the present disclosure includes a portable terminal or a fixed terminal. The portable terminal may be a video telephone, a cellular phone, a smart phone, an International Mobile Telecommunication 2000 (IMT-2000) terminal, a Wideband Code-Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an E-Book terminal, a portable computer (Notebook, Tablet Personal Computer (PC), or the like), a digital camera, etc. In addition, a fixed terminal may be a desktop PC or the like.

An apparatus capable of performing recharging and data communication includes a terminal and a connection device (for example, bridge device).

When the terminal is connected to the connection device, the terminal identifies the type of an external device connected to the connection device, based on the voltage received through the connection device. In addition, the terminal may operate in a recharging mode, a data communication mode, or a recharging and data communication mode, based on the type of the external device connected to the connection device. Although multiple devices may be connected to the terminal via the connection device, for simplicity, the various embodiments of the present disclosure are described below with one or two external devices connected to the terminal though the connection device.

In accordance with an embodiment of the present disclosure, the connection device is connected to a terminal and provides a recharging function, a data communication function, and a recharging and data communication function. The connection device connects the terminal and an external device. The terminal then supplies a voltage corresponding to the type of the connected external device to the connection device, and then the connection device provides a recharging function, a data communication function, and a recharging and data communication function.

In accordance with another embodiment of the present disclosure, the connection device may be an interconnected device, a connection device, a connection connector, a connection adaptor, a connection cable, etc.

Figure 1:
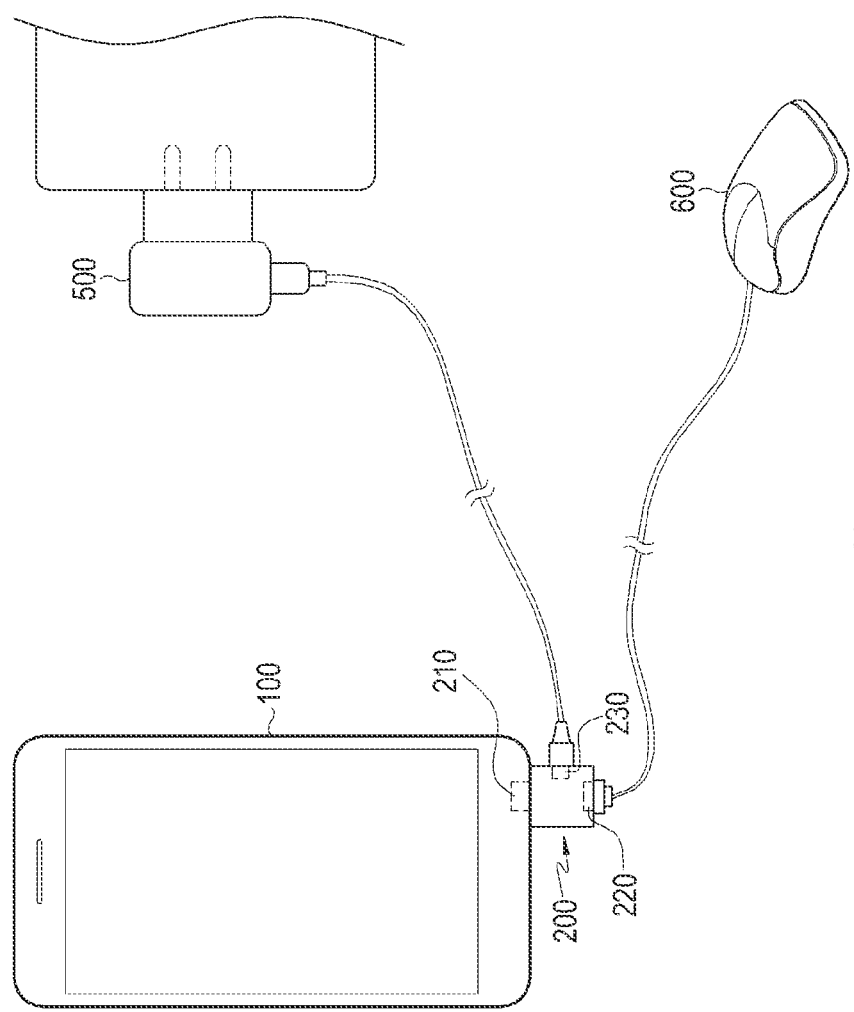
FIG. 1 illustrates a system that performs recharging and data communication according to an embodiment of the present disclosure.
Figure 2:
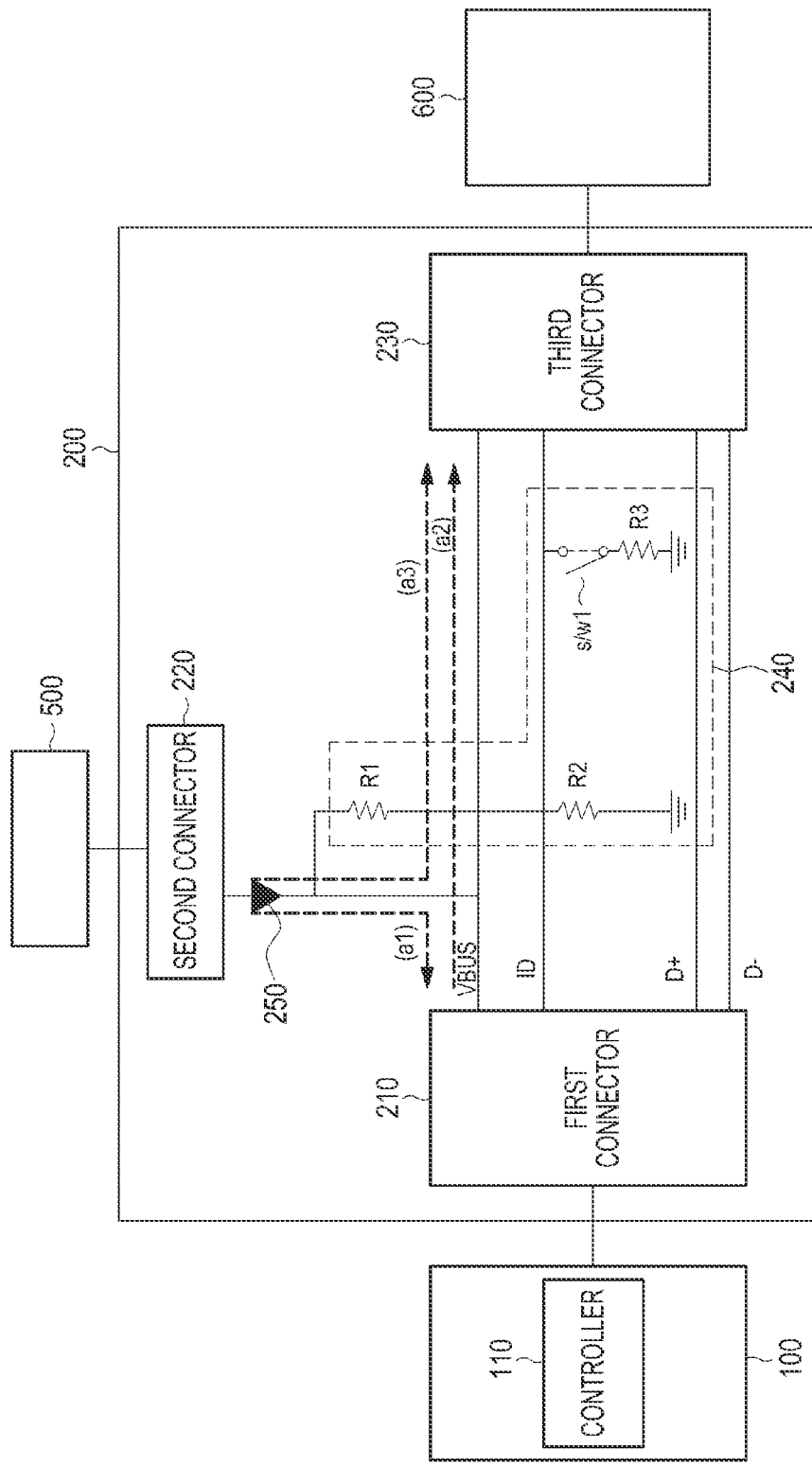
FIG. 2 is a block diagram illustrating a connection device according to an embodiment of the present disclosure.

FIG. 1 illustrates a system that performs recharging and data communication according to an embodiment of the present disclosure, and FIG. 2 is a block diagram illustrating a connection device according to an embodiment of the present disclosure.

Referring to FIGS. 1 and 2, the system includes a terminal 100 and a connection device 200. The terminal 100 includes a display and a controller 110, which controls the overall operations of the terminal 100.

When the controller 110 is connected to the connection device 200 and a first voltage is received from the connection device 200, the controller 110 converts the terminal 100 to a recharging mode and control the terminal 100 to be supplied with power provided through the connection device 200 and performs a recharging function.

When a second voltage is received from the connection device 200, the controller 110 controls the terminal 100 to operate in a data communication mode, and so that the power of the terminal 100 is supplied to an external device 600 for data communication. Thereafter, data communication is performed with the external device 600 for data communication.

When a third voltage is received from the connection device 200, the controller 110 controls the terminal 100 to operate in a recharging and data communication mode, and so that power is supplied through the connection device 200, and data communication is simultaneously performed with the external device 600.

When the terminal 100 is connected to the connection device 200, the controller 110 can display an indication of the mode that the terminal 100 is operating in, on the display of the terminal 100. Herein, the types of modes include a recharging mode, a data communication mode, and a recharging and data communication mode.

Referring to FIG. 2, the connection device 200 includes a first connector 210, a second connector 220, a third connector 230, and a voltage supplier 240. The first connector 210 connects to the terminal 100, the second connector 220 connects to an external device 500 for power supply, and the third connector 230 connects to the external device 600 for data communication. For example, the second connector 220 may be a micro Universal Serial Bus (USB).

The voltage supplier 240 transmits voltage for informing the terminal 100 of the type of external device connected to the connection device 200.

When the external device 500 for power supply is connected to the second connector 220, the voltage supplier 240 supplies a first voltage for informing a recharging function to the terminal 100, which is connected to the first connector 210.

When the external device 600 for data communication is connected to the third connector 230, the voltage supplier 240 supplies a second voltage for informing a data communication function to the terminal 100.

When an external device 500 for power supply is connected to the second connector 220, and an external device 600 for data communication is connected to the third connector 230, the voltage supplier 240 supplies a third voltage for informing simultaneous recharging and data communication to the terminal 100.

More specifically, the voltage supplier 240 includes first to third resistors (R1-R3) and a first switch unit S/W1. When only the external device 500 for power supply is connected to the second connector 220, i.e., when the external device 600 is not connected to the connection device 200, a voltage (5V) received from the second connector 220 is distributed by the first resistor R1 and the second resistor R2, and the value of distributed first voltage is supplied to the terminal 100 connected to the first connector 210 through an ID line. The first switch unit S/W1 connecting the third resistor R3 and the ID line is in an off state.

When only the external device 600 for data communication is connected to the third connector 230, i.e., when the external device 500 is not connected to the connection device 200, the first switch unit S/W1 is in an on state, the second voltage (0 V) output through the second resistor R2 connected to a ground resistor of 0 V and the third resistor R3 connected to a ground resistor of 0 V is supplied to the terminal 100 connected to the first connector 210.

When the external device 500 for power supply is connected to the second connector 220 and the external device 600 for data communication is connected to the third connector 230, the first switch unit S/W1 is in an on state. Therefore, a voltage (5 V) received from the second connector 220 is distributed by the first resistor R1 to the third resistor R3, and the distributed third voltage is supplied to the terminal 100 connected to the first connector 210 through the ID line. The first voltage and the third voltage have different voltage values.

As described above, the terminal 100 performs recharging and data communication operations using the connection device 200.

More specifically, if the terminal 100 is connected to the first connector 210 of the connection device 200 and the external device 500 for power supply is connected to the second connector 220, the voltage supplier 240 of the connection device 200 transmits the first voltage to the terminal 100 connected to the first connector 210 through the ID line. If the first voltage is received from the connection device 200, the controller 110 of the terminal 100 detects the first voltage and controls the terminal 100 to operate in a recharging mode. Thereafter, the connection device 200 outputs voltage received from the external device 500 for power supply through a power diode 250 connected to the second connector 220, and the output voltage is supplied to the terminal 100 connected to the first connector 210 through a power supply line VBUS (a1), so that the controller 110 recharges the terminal 100.

If the terminal 100 is connected to the first connector 210 of the connection device 200 and the external device 600 for data communication is connected to the third connector 230, the voltage supplier 240 of the connection device 200 transmits the second voltage (0 V) to the terminal 100 connected to the first connector 210 through the ID line. If the second voltage is received from the connection device 200, the controller 110 controls the terminal 100 to operate in a data communication mode. Thereafter, the controller 110 supplies power of the terminal 100 to the device 600 for data communication connected to the third connector 230 through the power supply line VBUS (a2). In addition, the terminal 100 performs data communication with the device 600 for data communication through data communication lines D+ and D−.

If the terminal 100 is connected to the first connector 210 of the connection device 200, the external device 500 for power supply is connected to the second connector 220, and the external device 600 for data communication is connected to the third connector 230, the voltage supplier 240 of the connection device 200 transmits the third voltage to the terminal 100 connected to the first connector 210 through the ID line. If the third voltage is received from the connection device 200, the controller 110 controls the terminal 100 to operate in a recharging and data communication mode.

Basically, the controller 110 controls the terminal 100 to operate in a recharging and data communication mod, if the external device 600 for data communication is connected to the third connector 230, when the terminal is in a recharging mode, or if the external device 500 for power supply is connected to the second connector 220, when the terminal is in a data communication mode.

When the terminal 100 switches a recharging and data communication mode, if the connection device 200 outputs voltage received from the external device 500 for power supply through the power diode 250 connected to the second connector 220, the output voltage is supplied to the terminal 100 connected to the first connector 210 through the power supply line VBUS (a1), and power is supplied to the device 600 for data communication connected to the third connector 230 (a3).

While both of the terminal 100 and the external device 600 for data communication receive power from the external device 500 for power supply, the terminal 100 performs data communication with the device 600 for data communication connected to the third connector 230 through data communication lines D+ and D− of the connection device 200.

Figure 3:
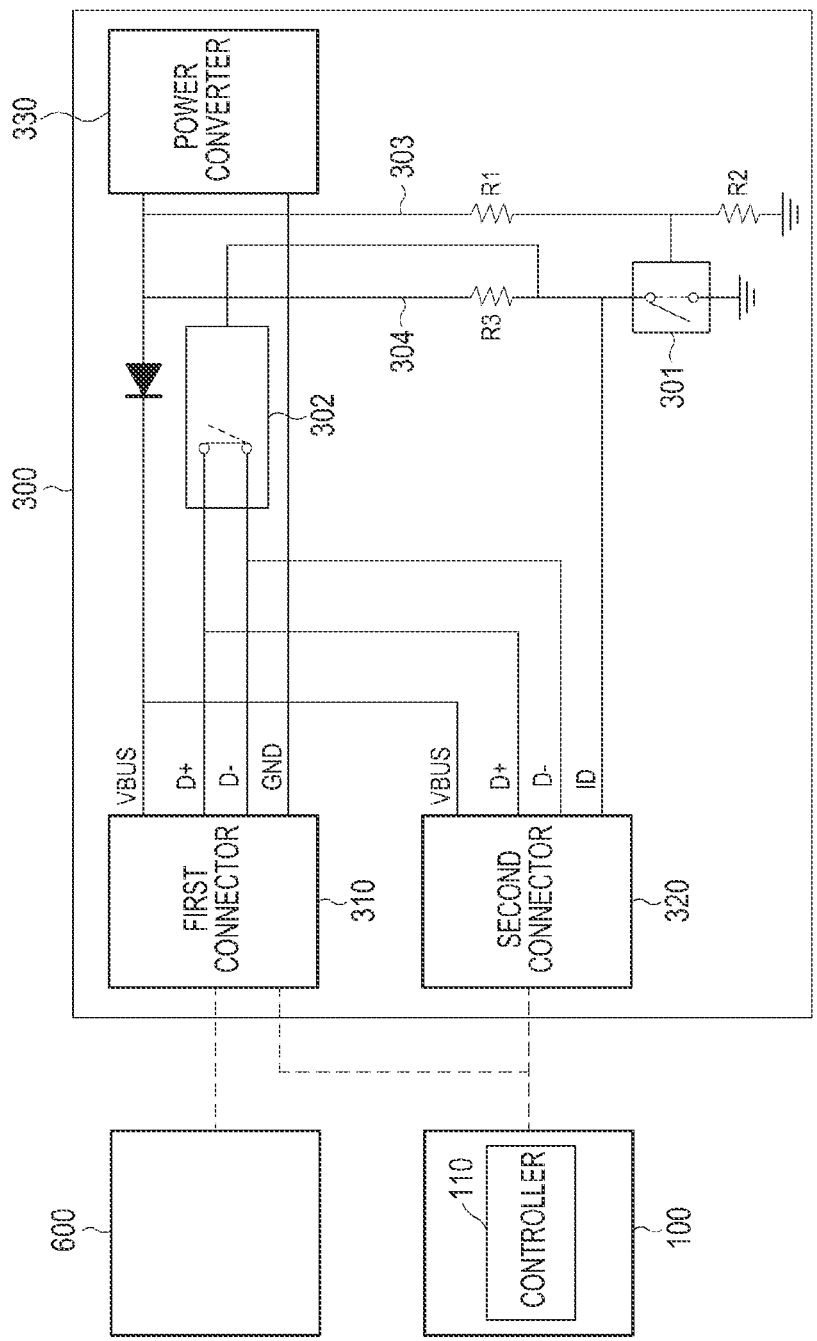
FIG. 3 is a block diagram illustrating a system that performs recharging and data communication according to an embodiment of the present disclosure.

FIG. 3 is a block diagram illustrating a system that performs recharging and data communication according to an embodiment of the present disclosure.

Referring to FIG. 3, the system includes the terminal 100 and a connection device 300.

The terminal 100 includes the display and the controller 110, which controls overall operations of the terminal 100. When voltage is not received from the connection device 300, the controller 110 controls the terminal to operate in a recharging mode, and controls the terminal 100 to perform a recharging function in which power is supplied through the connection device 300 and a battery of the terminal 100 is recharged.

When a second voltage is received from a separate connection line connecting the connection device 300 and the terminal 100, the controller 110 controls the terminal 100 to operate in a data communication mode, so that power of the terminal 100 is supplied to the external device 600 for data communication through the connection device 300 and data communication is performed with the external device 600.

When a third voltage is received from the connection device 300, the controller 110 controls the terminal 100 to operate in a recharging and data communication mode, so that power received from the connection device 300 is supplied and data communication is performed with the external device 600.

As described above, the terminal 100 can display an indication of the mode that it is operating in.

The connection device 300 includes a power converter 330, a first connector 310, a second connector 320, and the switches 301 and 302. Again, the second connector 320 may be a micro USB.

The terminal 100 and the external device 600 for data communication can connect to the first connector 310. However, when the external device 600 for data communication is connected to the first connector 310, the terminal 100 is connected to the second connector 320.

The switches 301 and 302 connect data communication lines D+ and D− (short) during a recharging function, and release the connection of the data communication lines (open) during a data communication function or a recharging and data communication function.

Basically, the connection device 300 sets a recharging function as a default. Therefore, when the terminal 100 is connected to the first connector 310 of the connection device 300, even though power informing of a type of connected external device is not received from the connection device 300, the terminal 100 operates in a recharging mode through power supply received from the connection device 300, so that a battery of the terminal 100 is recharged with the power. The operation of the terminal 100 performing recharging will be described in detail with reference to FIGS. 4 to 5.

In order to perform a data communication function through the connection device 300, the terminal 100 is connected to the connection device 300 through a separate connection line (not shown). The connection line 400 is for data communication, e.g., an OTG cable, and includes a fourth resistor R4 (not shown). Therefore, when the terminal 100 is connected to the second connector 320 through the connection line 400, a second voltage (OV), which is output through the forth resistor R4 connected to the ground with voltage of 0 V in the connection line 400, is transmitted to the terminal 100. The operation of the terminal 100 performing data communication will be described in detail with reference to FIGS. 6 to 7.

In addition, the terminal 100 can also operate in a data communication mode when receiving the second voltage.

In order to perform a recharging and data communication function through the connection device 300, the terminal 100 is connected to the connection device 300 through the connection line. When the terminal 100 is connected to the second connector 320 of the connection device 300 through the connection line and the voltage (5 V) provided from the power converter 330 of the connection device 300 is output through the second control line 304, the voltage (5 V) is distributed by the third resistor R3 of the connection device 300 and the fourth resistor R4 of the connection line 400 and the distributed third voltage is transmitted to the terminal 100 through the ID line. Thereafter, terminal 100 operates in a recharging and data communication mode. The operation of the terminal 100 performing recharging and data communication will be described in detail with reference to FIGS. 8 to 9.

Figure 4:
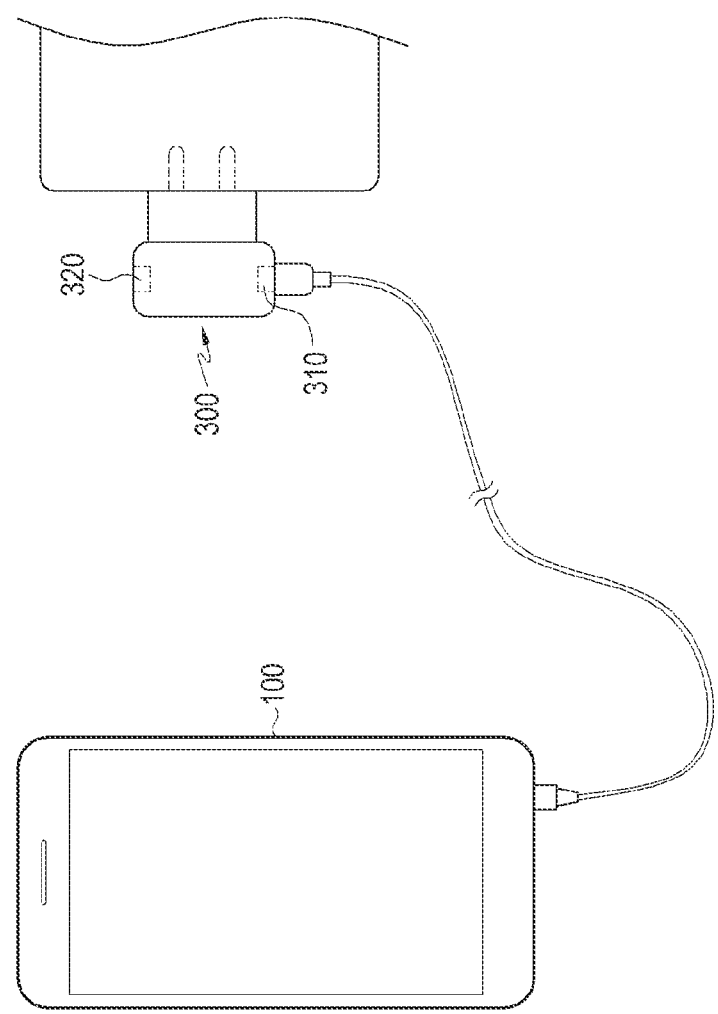
FIG. 4 illustrates a recharging function in a system that performs recharging and data communication according to an embodiment of the present disclosure.
Figure 5:
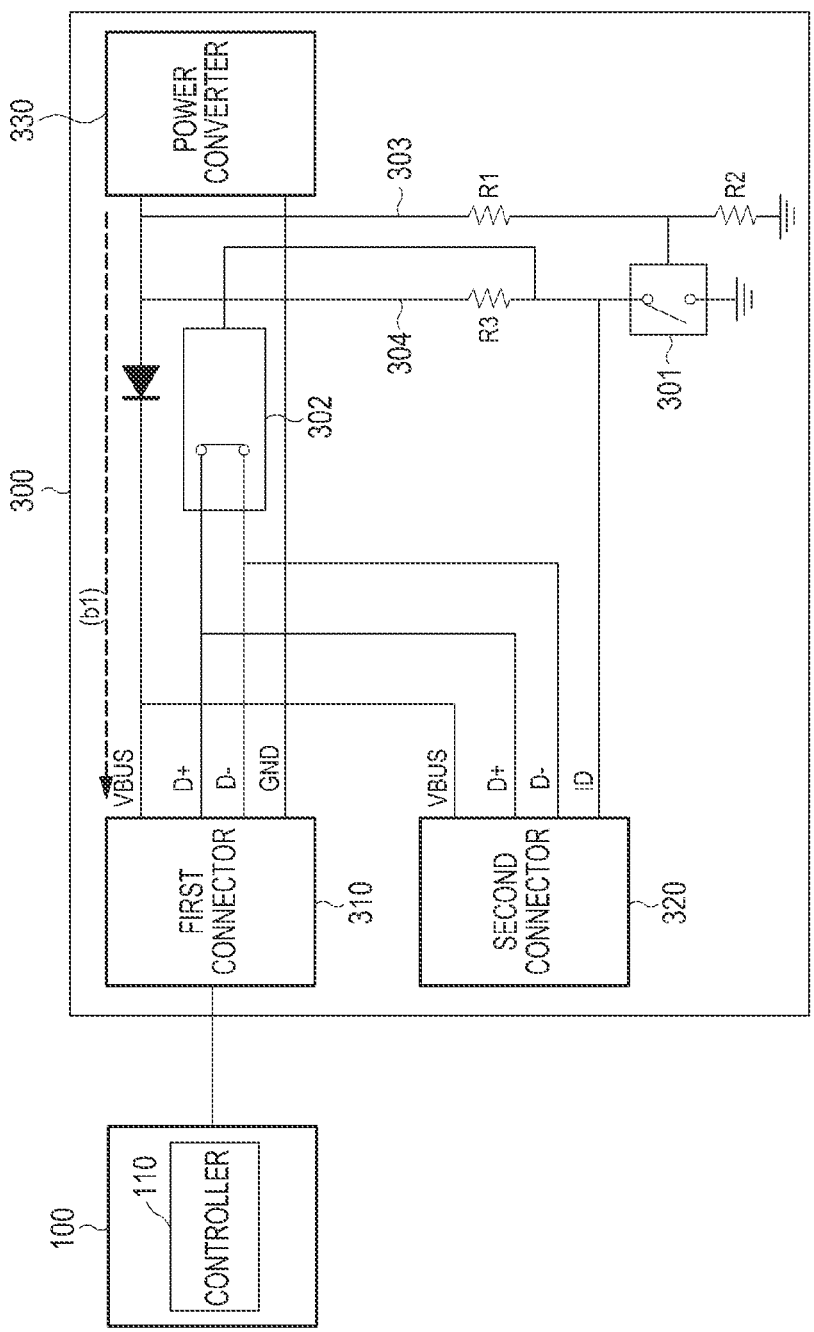
FIG. 5 is a block diagram illustrating a power supply operation of a connection device according to an embodiment of the present disclosure.

FIG. 4 illustrates a recharging function in a system that performs recharging and data communication according to an embodiment of the present disclosure. FIG. 5 is a block diagram illustrating a power supply operation of a connection device according to an embodiment of the present disclosure.

Referring to FIGS. 4 and 5, when power is supplied from the power converter 330 of the connection device 300 and the terminal 100 is connected to the first connector 310, voltage (5 V) supplied from the power converter 330 through the first control line 303 is distributed by the first resistor R1 and the second resistor R2 and the first switch 301 receiving a high signal by the distributed voltage is in an off state. In addition, voltage (5 V) received through the second control line 304 is decreased to a certain voltage by the third resistor R3, and the decreased voltage is output to the second switch 302, by the off state of the first switch 301. The second switch 302 receives a high signal according to the decreased voltage connects data communication lines D+ and D1 (short). After the data communication lines D+ and D1 are connected (short), the power received from the power converter 330 is supplied to the terminal 100 through the power supply line VBUS (b1), and the controller 110 controls the terminal 100 to perform a recharging function to supply power to the battery of the terminal 100.

The connection device 300 sets a recharging function as a default. Therefore, if the terminal 100 is connected to the first connector 310 of the connection device 300, even though the power informing of a type of connected external device is not received from the connection device 300, the terminal 100 is operates in a recharging mode.

Figure 6:
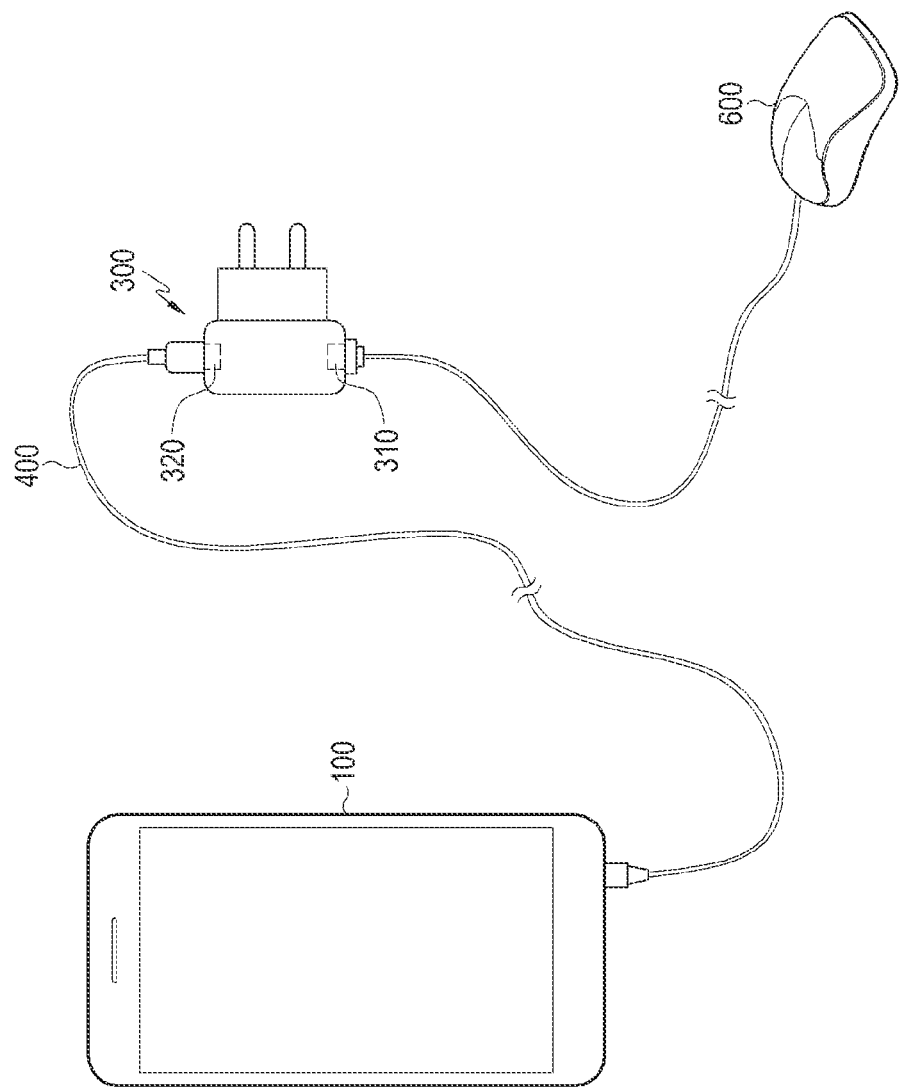
FIG. 6 illustrates an operation for performing a data communication function in a system that performs recharging and data communication according to an embodiment of the present disclosure.
Figure 7:
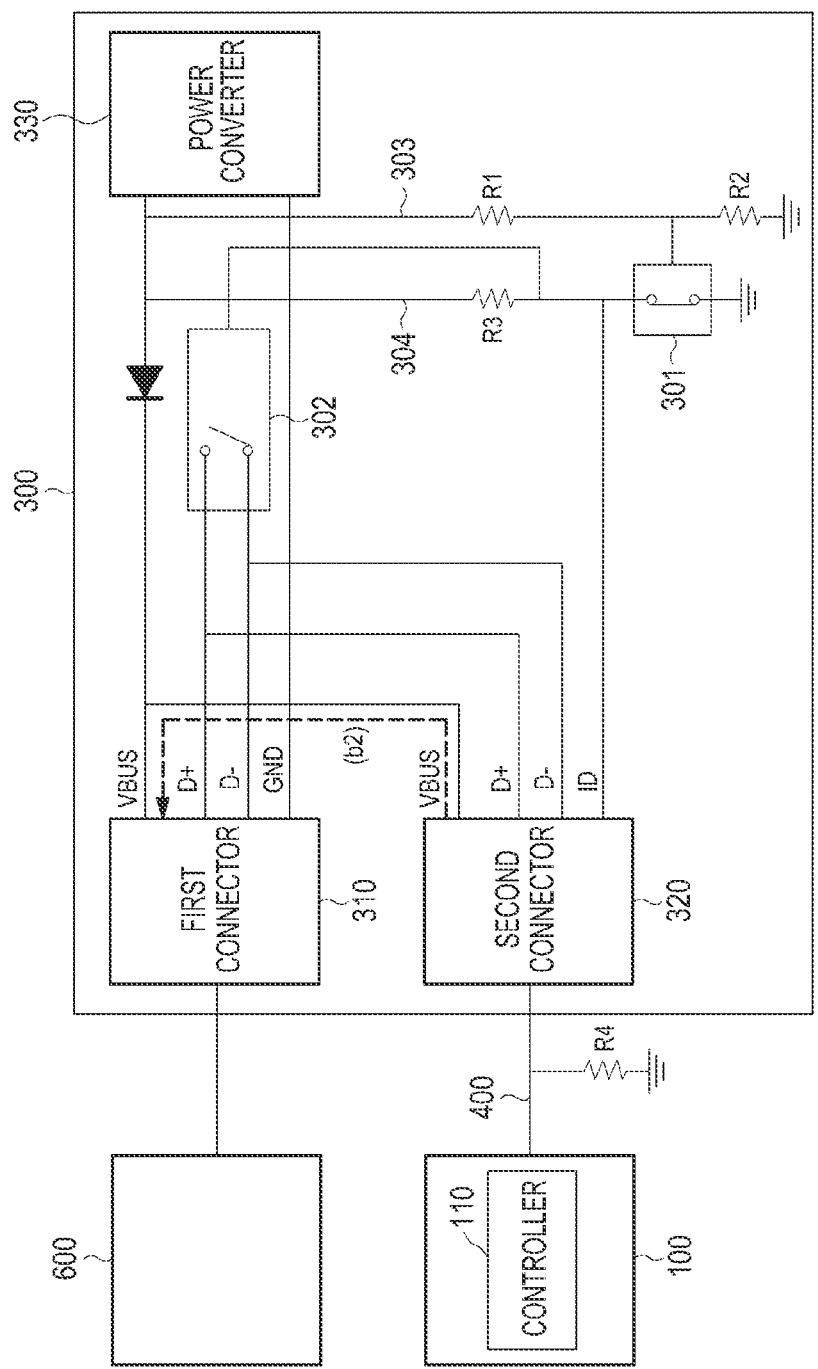
FIG. 7 is a block diagram illustrating a power supply and data communication operation in a connection device according to an embodiment of the present disclosure.

FIG. 6 illustrates an operation for performing a data communication function in a system that performs recharging and data communication according to an embodiment of the present disclosure. FIG. 7 is a block diagram illustrating a power supply and data communication operation according to an embodiment of the present disclosure.

Referring to FIGS. 6 and 7, when the external device 600 for data communication is connected to the first connector 310 of the connection device 300 and the terminal 100 is connected to the second connector 320 of the connection device 300 through a separate connection line 400, voltage is not received from the power converter 330, so the second voltage (OV) output through a resistor connected to the ground of 0 V in the connection line 400 is transmitted to the terminal 100. In addition, if the second voltage is received, the controller 110 of the terminal 100 controls the terminal 100 to operate in a data communication mode.

In addition, the first control line 303 outputs a low signal corresponding to a voltage of 0 V received from the second resistor R2 connected to the ground of 0 V to the first switch 301. The first switch 301 receives the low signal in an on state, and accordingly, the second control line 304 outputs a low signal to the second switch 302 so that the second switch 302 releases the connection of the data communication lines D+ and D−.

The controller 110 of the terminal 100, which is converted to the data communication mode, provides power of the terminal 100 to the external device 600 for data communication connected to the first connector 310 through the power supply line VBUS (b2). The controller 110 may perform a data communication function with the external device 600 for data communication connected to the first connector 310 through the data communication lines D+ and D−, while supporting electric power to the external device 600 for data communication through the connection device 300.

Figure 8:
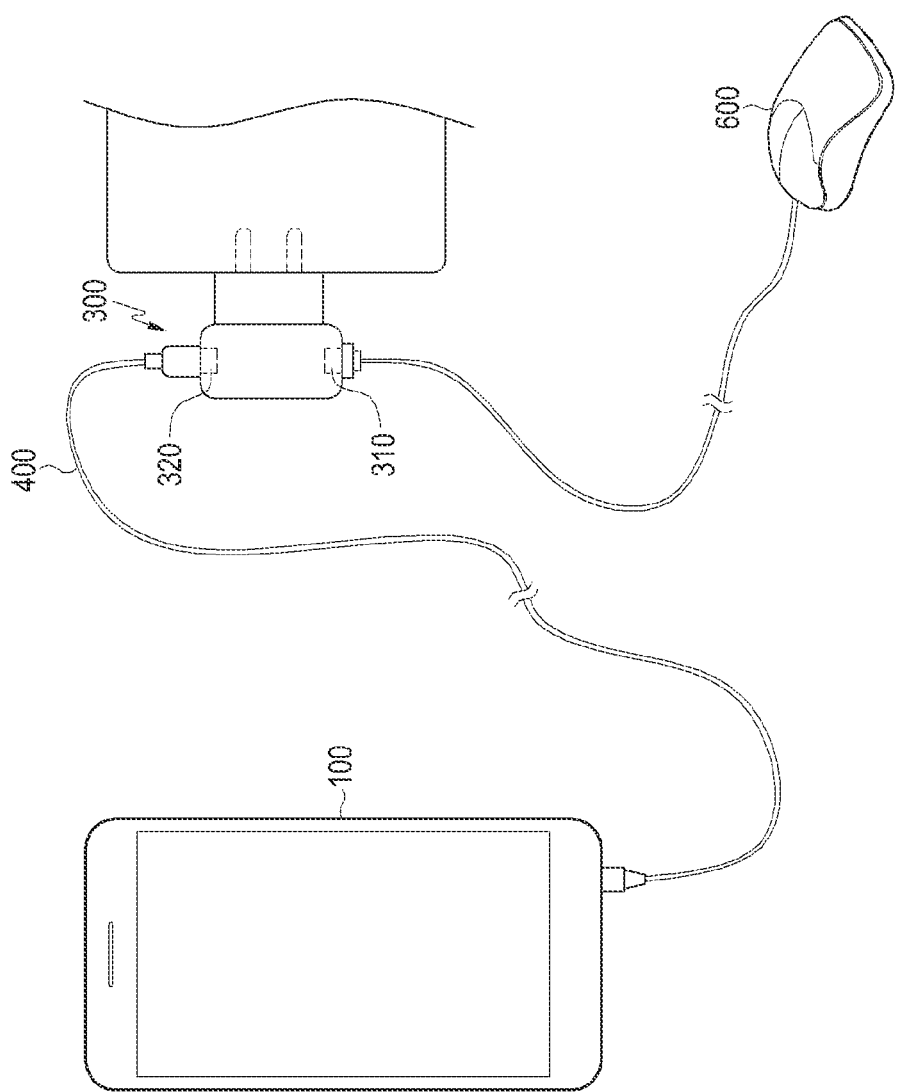
FIG. 8 illustrates a recharging and data communication mode in a system that performs recharging and data communication according to an embodiment of the present disclosure.
Figure 9:
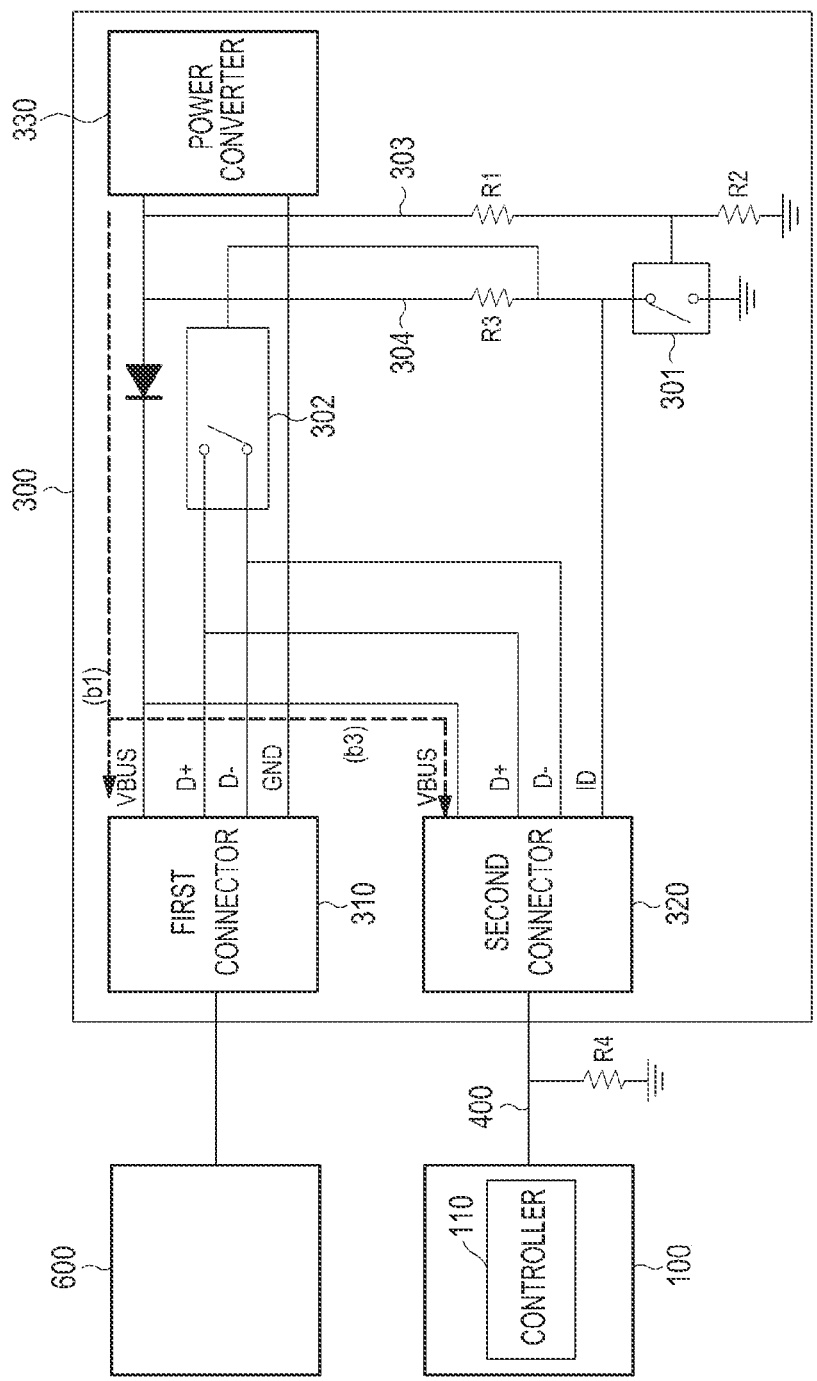
FIG. 9 is a block diagram illustrating a power supply and data communication operation in a connection device according to an embodiment of the present disclosure.

FIG. 8 illustrates a recharging and data communication mode in a system that performs recharging and data communication according to an embodiment of the present disclosure. FIG. 9 is a block diagram illustrating a power supply and data communication operation in a connection device according to an embodiment of the present disclosure.

Referring to FIGS. 8 and 9, when power is supplied from the power converter 330 of the connection device 300, the external device 600 for data communication is connected to the first connector 310, and the terminal 100 is connected to the second connector 320 through a separate connection line 400, the voltage (5 V) supplied from the power converter 330 through the first control line 303 is distributed by the first resistor R1 and the second resistor R2. Based on the distributed voltage, the first switch 301 receives the high signal and switches to an off state. In addition, the voltage (5 V) received from the second control line 304 is distributed by the third resistor R3 and the fourth resistor R4 included the connection line 400, and the distributed voltage has a voltage lower than the voltage corresponding to the high signal to output a low signal to the second switch 302. Based on the low signal, the second switch 302 releases the connection of the data communication lines D+ and D−.

In addition, when the terminal 100 is connected to the second connection line 320 of the connection device 300 through the connection line 400, the voltage (5 V) output through the second control line 304 is distributed by the third resistor R3 and the fourth resistor R4, and the distributed third voltage is transmitted to the terminal 100 through an ID line. Therefore, when the third voltage is received through the ID line, the controller 110 of the terminal 100 controls the terminal 100 to operate in a recharging and data communication mode.

When the terminal 100 is in the recharging and data communication mode and the connection of the data communication lines D+ and D− is released, the power received from the power converter 330 is supplied to both the terminal 100 connected to the second connector 320 and the external device 600 for data communication connected to the first connector 310 through the power supply line VBUS (b1, b3).

In addition, the controller 110 of the terminal 100 may perform data communication with the external device 600 for data communication connected to the first connector 310 through the data communication lines D+ and D−, while receiving power from the connection device 300.

Although the above-described embodiments of the present disclosure provide a separate connection device, the connection device may be included in the terminal. If the connection device is included in the terminal, the terminal receives a recharging function, a data communication function, or a recharging and data communication function from the connection device included therein, as received from a separate connection device.

For example, if the connection device 200 is included in the terminal 100, the connection device 200 performs the same operations as a separate connection device 200 to provide the terminal 100 with a recharging function, a data communication function, or a recharging and data communication function.

In addition, if the connection device 300 is included in the terminal 100, the connection device 300 may further include a separate switch for connecting the first connector 310 and the second connector 320. Therefore, the terminal 100 in the recharging mode is connected to the first connector 310 through the separate switch and receives power received through a power converter.

In addition, in the data communication mode, the terminal 100 is connected to the second connector 320 through the separate switch, and performs data communication while supplying power to the external device for data communication connected to the first connector 310.

In addition, in the recharging and data communication mode, the terminal 100 is connected to the second connector 320 through the separate switch, and performs data communication with the external device for data communication connected to the first connector 310, while receiving power from the power converter 330.

The above-described systems that perform recharging and data communication may be implemented on a computer-readable recording medium by a computer-readable code. The computer-readable medium includes all kinds of recording media on which data readable by a computer system is stored. An example of recording medium is Read Only Memory (ROM), Random Access Memory (RAM), an optical disc, a magnetic tape, a floppy disc, a hard disk, or a non-volatile memory. In addition, the computer-readable recording medium is distributed to computer systems connected through a network so that computer-readable codes are stored and implemented in a distributed form.

The above-described embodiments of the present disclosure provide a terminal a recharging function, a data communication function, or a recharging and data communication function by providing a device capable of performing simultaneous recharging and data communication through a connection with a connection device.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A connection device for providing a recharging and data communication function, the connection device comprising:
    a first connector that connects a terminal;
    second and third connectors that connect external devices; and
    a voltage supplier that provides the terminal connected to the first connector with different voltages for informing of a recharging function, a data communication function, and a recharging and data communication function, respectively, based on a type of the external device connected to the second connector,
    wherein the connection device performs the recharging function to provide the terminal with power supplied from a first external device for power supply, when the terminal is connected to the first connector and the first external device for power supply is connected to the second connector,
    wherein the connection device performs the data communication function to provide the data communication between the terminal and a second external device for data communication, and provides the second external device for data communication with power supplied from the terminal, when the terminal is connected to the first connector and the second external device for data communication is connected to the third connector, and
    wherein the connection device provides the data communication between the terminal and the second external device for data communication, and provides the terminal and the second external device for data communication with the power supplied from the first external device for power supply, when the terminal is connected to the first connector, the first external device for power supply is connected to the second connector, and the second external device for data communication is connected to the third connector.

2. The connection device of claim 1, wherein when the first external device for power supply is connected to the second connector, the voltage supplier provides the terminal connected to the first connector with a first voltage for informing the terminal that the recharging function is to be performed,
    wherein when the second external device for data communication is connected to the third connector, the voltage supplier provides the terminal connected to the first connector with a second voltage for informing the terminal that the data communication function is to be performed, and
    wherein when the first external device for power supply is connected to the second connector and the second external device for data communication is connected to the third connector, the voltage supplier provides the terminal connected to the first connector with a third voltage for informing the terminal that the recharging and data communication function is to be performed.

3. A connection device for providing a recharging and data communication function, the connection device comprising:
- a power converter that supplies power;
- a first connector that connects a terminal or an external device for data communication;
- a second connector that connects the terminal, when the external device for data communication is connected to the first connector; and
- a switch that connects data communication lines, when a recharging function is performed based on a type of the external device connected to the first connector, and releases a connection of the data communication lines, when a data communication function or a recharging and data communication function is performed,
- wherein the connection device performs the recharging function to provide the terminal with the power supplied from the power converter, when the power is supplied from the power converter and the terminal is connected to the first connector,
- wherein the connection device performs the data communication function to provide data communication between the external device for data communication and the terminal, and provides the external device for data communication with power supplied from the terminal, when the external device for data communication is connected to the first connector and the terminal is connected to the second connector, and
- wherein the connection device provides the data communication between the external device for data communication and the terminal, and provides the power supplied from the power converter to the external device for data communication and the terminal, when the power is supplied from the power converter, the external device for data communication is connected to the first connector, and the terminal is connected to the second connector.

4. The connection device according to claim 3, wherein the connection device provides a voltage for informing of recharging and data communication to the terminal connected to the second connector, when the power is supplied from the power converter and the external device for data communication is connected to the first connector.

5. The connection device according to claim 3, wherein the connection device provides the terminal with the recharging function, set as a default, when the terminal is connected to the first connector, and provides the terminal with a voltage for informing of a data communication mode, when the terminal is connected to the second connector.

6. A terminal for performing recharging and data communication, the terminal comprising:
- a display that displays an indication of a mode performed by a connection device, when the connection device is connected to the terminal; and
- a controller that determines a type of an external device connected to the connection device, based on voltage received from the connection device, when the terminal is connected with the connection device, and that performs a recharging mode, a data communication mode, or a recharging and data communication mode according to the type of the external device,
- wherein the terminal receives power supplied through the connection device in the recharging mode, when a first voltage is received from the connection device,
- wherein the terminal performs data communication with an external device for data communication and provides power through the connection device to the external device for data communication in the data communication mode, when a second voltage is received from the connection device, and
- wherein the terminal performs data communication with the external device for data communication and receives power through the connection device in the recharging and data communication mode, when a third voltage is received from the connection device.

7. The terminal according to claim 6, wherein the terminal receives power provided through the connection device in the recharging mode, when voltage is not received from the connection device,
- wherein the terminal performs data communication with an external device for data communication and provides power to the external device for data communication through the connection device in the data communication mode, when a voltage for informing of the data communication mode is received from the connection device, and
- wherein the terminal performs the data communication with the external device for data communication and receives power through the connection device in the recharging and data communication mode, when a voltage for informing of recharging and data communication is received from the connection device.

* * * * *